United States Patent
Yamazaki

(10) Patent No.: US 11,822,058 B2
(45) Date of Patent: Nov. 21, 2023

(54) IMAGING LENS

(71) Applicant: TOKYO VISIONARY OPTICS CO., LTD., Tokyo (JP)

(72) Inventor: Masaki Yamazaki, Toky (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 6 days.

(21) Appl. No.: 17/097,767

(22) Filed: Nov. 13, 2020

(65) Prior Publication Data

US 2021/0389571 A1    Dec. 16, 2021

(30) Foreign Application Priority Data

Nov. 13, 2019   (JP) .................................. 2019-205378

(51) Int. Cl.
  *G02B 13/00*    (2006.01)
  *G02B 9/62*     (2006.01)
  *G02B 13/06*    (2006.01)
  *G02B 27/00*    (2006.01)

(52) U.S. Cl.
  CPC ........... *G02B 13/0045* (2013.01); *G02B 9/62* (2013.01); *G02B 13/06* (2013.01); *G02B 27/0025* (2013.01)

(58) Field of Classification Search
  CPC ...... G02B 13/0045; G02B 9/62; G02B 13/06; G02B 27/0025
  USPC ................................. 359/713, 752, 756, 761
  See application file for complete search history.

(56) References Cited

U.S. PATENT DOCUMENTS

| | | | |
|---|---|---|---|
| 2015/0124333 A1 | 5/2015 | Noda et al. | |
| 2016/0154211 A1 | 6/2016 | Jo | |

FOREIGN PATENT DOCUMENTS

| | | | | | |
|---|---|---|---|---|---|
| CN | 110297312 | A | * | 10/2019 | ......... G02B 13/0045 |
| CN | 110297312 | A | | 10/2019 | |
| JP | H07-27976 | A | | 1/1995 | |
| JP | 2005-258294 | A | | 9/2005 | |
| JP | 2006-113404 | A | | 4/2006 | |
| JP | 2007-133133 | A | | 5/2007 | |
| JP | 2007-232997 | A | | 9/2007 | |
| JP | 2011-175234 | A | | 9/2011 | |
| JP | 2011-203418 | A | | 10/2011 | |
| JP | 5752856 | B2 | | 7/2015 | |
| JP | 6553270 | B1 | * | 7/2019 | ......... G02B 13/0045 |
| JP | 6553270 | B1 | | 7/2019 | |

OTHER PUBLICATIONS

Office Action issued in Japanese Patent Application No. 2019-205378, Jul. 25, 2023, with English translation (8 pages).

* cited by examiner

*Primary Examiner* — William Choi

(74) *Attorney, Agent, or Firm* — Hamre, Schumann, Mueller & Larson, P.C.

(57) ABSTRACT

There is provided an imaging lens with excellent optical characteristics which satisfies demand of wide field of view and low F-number. An imaging lens comprising in order from an object side to an image side, a first lens with negative refractive power in a paraxial region, a second lens with positive refractive power having a convex object-side surface in a paraxial region, a third lens with positive refractive power in a paraxial region, a fourth lens, a fifth lens having a concave object-side surface in a paraxial region, and a sixth lens having a concave image-side surface in a paraxial region, and predetermined conditional expressions are satisfied.

7 Claims, 7 Drawing Sheets

IMAGING LENS

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function is mounted in various products, such as information terminal equipment, home appliances, automobiles, and the like. Development of products with the camera function will be made accordingly.

The imaging lens mounted in such equipment is required to be compact and to have high-resolution performance.

As a conventional imaging lens aiming high performance, for example, the imaging lens disclosed in the following Patent Document 1 has been known.

Patent Document 1 (JP5752856B) discloses an imaging lens substantially comprising six lenses, in order from an object side, a first lens with negative refractive power having a meniscus shape with a concave object-side surface, a second lens with positive refractive power, a third lens with negative refractive power, a fourth lens with positive refractive power having a meniscus shape with a concave object-side surface, a fifth lens, and a sixth lens having a concave image-side surface which is aspheric and has at least one inflexion point, wherein a relationship between a focal length of the overall optical system and a curvature radius of an image-side surface of the sixth lens satisfies a certain condition.

SUMMARY OF THE INVENTION

However, in lens configurations disclosed in the Patent Document 1, when a wide field of view and a low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the wide field of view and the low F-number in well balance and excellently corrects aberrations.

Regarding terms used in the present invention, "a convex surface (a surface being convex)", "a concave surface (a surface being concave)" or "a flat surface (a surface being flat)" of lens surfaces implies a shape of the lens surface in a paraxial region (near the optical axis). "Refractive power" implies the refractive power in a paraxial region. "A pole point" implies an off-axial point on an aspheric surface at which a tangential plane intersects the optical axis perpendicularly. "A total track length" is defined as a distance along the optical axis from an object-side surface of an optical element located closest to the object to an image plane. "The total track length" and "a back focus" is a distance obtained when thickness of an IR cut filter or a cover glass which may be arranged between the imaging lens and the image plane is converted into an air-converted distance.

Means for Solving Problems

An imaging lens according to the present invention comprises, in order from an object side to an image side, a first lens with negative refractive power in a paraxial region, a second lens with positive refractive power having a convex object-side surface in a paraxial region, a third lens with positive refractive power in a paraxial region, a fourth lens, a fifth lens having a concave object-side surface in a paraxial region, and a sixth lens having a concave image-side surface in a paraxial region.

The first lens achieves a wide field of view by strengthening the refractive power.

The second lens achieves reduction in a profile, and properly corrects coma aberration, astigmatism, and distortion. Furthermore, when the second lens has the object-side surface being convex in the paraxial region, the coma aberration and the astigmatism are more properly corrected.

The third lens achieves reduction in a profile, and properly corrects spherical aberration, the coma aberration, field curvature, and the distortion.

The fourth lens properly corrects the astigmatism, the field curvature, and the distortion.

The fifth lens properly corrects the coma aberration, the astigmatism, and the distortion. When the fifth lens has the object-side surface being concave in the paraxial region, the astigmatism and the distortion can be more properly corrected.

The sixth lens properly corrects the astigmatism, the field curvature, and the distortion. When the sixth lens has the image-side surface being concave in the paraxial region, the low profile is maintained and a back focus is secured.

According to the imaging lens having the above-described configuration, it is preferable that the first lens has an image-side surface being concave in the paraxial region.

When the first lens has the image-side surface being concave in the paraxial region, the astigmatism and the distortion can be properly corrected.

According to the imaging lens having the above-described configuration, it is preferable that the third lens has an image-side surface being convex in the paraxial region.

When the third lens has the image-side surface being convex in the paraxial region, the coma aberration, the field curvature, and the distortion can be properly corrected.

According to the imaging lens having the above-described configuration, it is preferable that the sixth lens has an object-side surface being convex in the paraxial region.

When the sixth lens has the object-side surface being convex in the paraxial region, the astigmatism, the field curvature, and the distortion can be properly corrected.

According to the imaging lens having the above-described configuration, it is preferable that the object-side surface of the sixth lens is formed as an aspheric surface having at least one pole point in the position off the optical axis.

When the object-side surface of the sixth lens is formed as the aspheric surface having at least one pole point in the position off the optical axis, the field curvature and the distortion can be properly corrected.

According to the imaging lens having the above-described configuration, it is preferable that the image-side surface of the sixth lens is formed as an aspheric surface having at least one pole point in the position off the optical axis.

When the image-side surface of the sixth lens is formed as the aspheric surface having at least one pole point in the position off the optical axis, the field curvature and the distortion can be properly corrected.

According to the imaging lens having the above-described configuration, it is preferable that the following conditional expression (1) is satisfied:

$$0.20 < vd2/vd6 < 0.60 \quad (1)$$

where vd2: an abbe number at d-ray of the second lens, and vd6: an abbe number at d-ray of the sixth lens.

The conditional expression (1) defines an appropriate range of the abbe numbers at d-ray of the second lens and the sixth lens. By satisfying the conditional expression (1), chromatic aberration can be properly corrected.

According to the imaging lens having the above-described configuration, it is preferable that the following conditional expression (2) is satisfied:

$$12.50<|f6|/D6<90.00 \qquad (2)$$

where f6: a focal length of the sixth lens, and

D6: a thickness along the optical axis of the sixth lens.

The conditional expression (2) defines an appropriate range of a relationship between the focal length of the sixth lens and the thickness along the optical axis of the sixth lens. By satisfying the conditional expression (2), reduction in the profile can be achieved, the astigmatism, the field curvature and the distortion can be properly corrected.

According to the imaging lens having the above-described configuration, it is preferable that the following conditional expression (3) is satisfied:

$$2.50<r12/r2/D6<7.00 \qquad (3)$$

where r12: a paraxial curvature radius of an image-side surface of the sixth lens, r2: a paraxial curvature radius of an image-side surface of the first lens, and D6: a thickness along the optical axis of the sixth lens.

The conditional expression (3) defines an appropriate range of a relationship among the paraxial curvature radius of an image-side surface of the sixth lens, the paraxial curvature radius of an image-side surface of the first lens, and the thickness along the optical axis of the sixth lens. By satisfying the conditional expression (3), the astigmatism, the field curvature and the distortion can be properly corrected.

According to the imaging lens having the above-described configuration, it is preferable that the following conditional expression (4) is satisfied:

$$5.25<|f6|/f<50.00 \qquad (4)$$

where f6: a focal length of the sixth lens, and f: a focal length of the overall optical system of the imaging lens.

The conditional expression (4) defines an appropriate range of the focal length of the sixth lens. By satisfying the conditional expression (4), refractive power of the sixth lens becomes appropriate, and the astigmatism, the field curvature and the distortion can be properly corrected.

According to the imaging lens having the above-described configuration, it is preferable that the following conditional expression (5) is satisfied:

$$-45.00<|f6|/f1<-5.00 \qquad (5)$$

where f6: a focal length of the sixth lens, and f1: a focal length of the first lens.

The conditional expression (5) defines an appropriate range of a relationship between the focal length of the sixth lens and the focal length of the first lens. By satisfying the conditional expression (5), refractive powers of the sixth lens and the first lens can be appropriately balanced. As a result, the wide field of view can be achieved, and the chromatic aberration, the spherical aberration, the astigmatism, the field curvature, and the distortion can be properly corrected.

According to the imaging lens having the above-described configuration, it is preferable that the following conditional expression (6) is satisfied:

$$-0.95<r2/r6<-0.40 \qquad (6)$$

where r2: a paraxial curvature radius of an image-side surface of the first lens, and r6: a paraxial curvature radius of an image-side surface of the third lens.

The conditional expression (6) defines an appropriate range of a relationship between the paraxial curvature radius of the image-side surface of the first lens and the paraxial curvature radius of the image-side surface of the third lens. By satisfying the conditional expression (6), the coma aberration, the astigmatism, the field curvature, and the distortion can be properly corrected.

According to the imaging lens having the above-described configuration, it is preferable that the following conditional expression (7) is satisfied:

$$-1.00<r6/r12<-0.25 \qquad (7)$$

where r6: a paraxial curvature radius of an image-side surface of the third lens, and r12: a paraxial curvature radius of an image-side surface of the sixth lens.

The conditional expression (7) defines an appropriate range of a relationship between the paraxial curvature radius of the image-side surface of the third lens and the paraxial curvature radius of the image-side surface of the sixth lens. By satisfying the conditional expression (7), the coma aberration, the astigmatism, the field curvature, and the distortion can be properly corrected.

According to the imaging lens having the above-described configuration, it is preferable that the following conditional expression (8) is satisfied:

$$0.75<r12/f<2.00 \qquad (8)$$

where r12: a paraxial curvature radius of an image-side surface of the sixth lens, and f: a focal length of the overall optical system of the imaging lens.

The conditional expression (8) defines an appropriate range of the paraxial curvature radius of the image-side surface of the sixth lens. By satisfying the conditional expression (8), the astigmatism, the field curvature, and the distortion can be properly corrected.

According to the imaging lens having the above-described configuration, it is preferable that the following conditional expression (9) is satisfied:

$$0.20<T4/T5<1.70 \qquad (9)$$

where

T4: a distance along the optical axis from an image-side surface of the fourth lens to an object-side surface of the fifth lens, and T5: a distance along the optical axis from an image-side surface of the fifth lens to an object-side surface of the sixth lens.

The conditional expression (9) defines an appropriate range of a relationship between the distance along the optical axis from an image-side surface of the fourth lens to an object-side surface of the fifth lens, and the distance along the optical axis from an image-side surface of the fifth lens to an object-side surface of the sixth lens. By satisfying the conditional expression (9), the fifth lens is arranged at an optimum position, and aberration correction function of the lens becomes more effective. As a result, reduction in the profile can be achieved, and the coma aberration, the astigmatism and the distortion can be properly corrected.

According to the imaging lens having the above-described configuration, it is preferable that the following conditional expression (10) is satisfied:

$$2.50 < f3/D3 < 8.00 \quad (10)$$

where f3: a focal length of the third lens, and

D3: a thickness along the optical axis of the third lens.

The conditional expression (10) defines an appropriate range of a relationship between the focal length of the third lens and the thickness along the optical axis of the third lens. By satisfying the conditional expression (10), the spherical aberration, the coma aberration, the field curvature, and the distortion can be properly corrected.

According to the imaging lens having the above-described configuration, it is preferable that the following conditional expression (11) is satisfied:

$$0.50 < |f5|/f < 2.00 \quad (11)$$

where f5: a focal length of the fifth lens, and f: a focal length of the overall optical system of the imaging lens.

The conditional expression (11) defines an appropriate range of the focal length of the fifth lens. By satisfying the conditional expression (11), the coma aberration, the astigmatism and the distortion can be properly corrected.

According to the imaging lens having the above-described configuration, it is preferable that the following conditional expression (12) is satisfied:

$$-1.00 < f1/|f5| < -0.30 \quad (12)$$

where f1: a focal length of the first lens, and f5: a focal length of the fifth lens.

The conditional expression (12) defines an appropriate range of a relationship between the focal length of the first lens and the focal length of the fifth lens. By satisfying the conditional expression (12), refractive powers of the first lens and the fifth lens can be appropriately balanced. As a result, the coma aberration, the astigmatism, and the distortion can be properly corrected.

According to the imaging lens having the above-described configuration, it is preferable that the following conditional expression (13) is satisfied:

$$0.25 < f3/|f4| < 1.80 \quad (13)$$

where f3: a focal length of the third lens, and f4: a focal length of the fourth lens.

The conditional expression (13) defines an appropriate range of a relationship between the focal length of the third lens and the focal length of the fourth lens. By satisfying the conditional expression (13), refractive powers of the third lens and the fourth lens can be appropriately balanced. As a result, the spherical aberration, the coma aberration, the astigmatism, the field curvature, and the distortion can be properly corrected.

According to the imaging lens having the above-described configuration, it is preferable that the following conditional expression (14) is satisfied:

$$-4.50 < r6/D3 < -1.65 \quad (14)$$

where r6: a paraxial curvature radius of an image-side surface of the third lens, and D3: a thickness along the optical axis of the third lens.

The conditional expression (14) defines an appropriate range of a relationship between the paraxial curvature radius of the image-side surface of the third lens and the thickness along the optical axis of the third lens. By satisfying the conditional expression (14), the coma aberration, the field curvature and the distortion can be properly corrected.

According to the imaging lens having the above-described configuration, it is preferable that the following conditional expression (15) is satisfied:

$$0.35 < |r8|/r11 < 8.50 \quad (15)$$

where r8: a paraxial curvature radius of an image-side surface of the fourth lens, and r11: a paraxial curvature radius of an object-side surface of the sixth lens.

The conditional expression (15) defines an appropriate range of a relationship between the paraxial curvature radius of the image-side surface of the fourth lens and the paraxial curvature radius of the object-side surface of the sixth lens. By satisfying the conditional expression (15), the astigmatism, the field curvature, and the distortion can be properly corrected.

According to the imaging lens having the above-described configuration, it is preferable that the following conditional expression (16) is satisfied:

$$-28.50 < r9/f < -0.40 \quad (16)$$

where r9: a paraxial curvature radius of an object-side surface of the fifth lens, and f: a focal length of the overall optical system of the imaging lens.

The conditional expression (16) defines an appropriate range of the paraxial curvature radius of the object-side surface of the fifth lens. By satisfying the conditional expression (16), the astigmatism and the distortion can be properly corrected.

According to the imaging lens having the above-described configuration, it is preferable that the following conditional expression (17) is satisfied:

$$0.70 < r11/f < 2.50 \quad (17)$$

where r11: a paraxial curvature radius of an object-side surface of the sixth lens, and f: a focal length of the overall optical system of the imaging lens.

The conditional expression (17) defines an appropriate range of the paraxial curvature radius of the object-side surface of the sixth lens. By satisfying the conditional expression (17), the astigmatism, the field curvature, and the distortion can be properly corrected.

According to the imaging lens having the above-described configuration, it is preferable that the following conditional expression (18) is satisfied:

$$1.50 < r12/r2 < 3.30 \quad (18)$$

where r12: a paraxial curvature radius of an image-side surface of the sixth lens, and r2: a paraxial curvature radius of an image-side surface of the first lens.

The conditional expression (18) defines an appropriate range of a relationship between the paraxial curvature radius of the image-side surface of the sixth lens and the paraxial curvature radius of the image-side surface of the first lens. By satisfying the conditional expression (18), the astigmatism, the field curvature, and the distortion can be properly corrected.

Effect of Invention

According to the present invention, there can be provided an imaging lens with high resolution which satisfies demand of the wide field of view and the low F-number in well balance, and properly corrects aberrations.

DETAILED DESCRIPTION OF THE PREFERRED EMBODIMENT

Hereinafter, the preferred embodiment of the present invention will be described in detail referring to the accompanying drawings.

FIGS. 1, 3, 5, 7, 9, 11 and 13 are schematic views of the imaging lenses in Examples 1 to 7 according to the embodiments of the present invention, respectively.

The imaging lens according to the present embodiment comprises, in order from an object side to an image side, a first lens L1 with negative refractive power in a paraxial region, a second lens L2 with positive refractive power having a convex object-side surface in a paraxial region, a third lens L3 with positive refractive power in a paraxial region, a fourth lens L4, a fifth lens L5 having a concave object-side surface in a paraxial region, and a sixth lens L6 having a concave image-side surface in a paraxial region.

A filter IR such as an IR cut filter and a cover glass are arranged between the sixth lens L6 and an image plane IMG (namely, the image plane of an image sensor). The filter IR is omissible.

An aperture stop ST is disposed between the second lens L2 and the third lens L3, and correction of distortion becomes facilitated. A location of the aperture stop ST is not limited to the one between the second lens L2 and the third lens L3. The aperture stop ST may be disposed according to a specification of the image sensor.

The first lens L1 has the negative refractive power and is formed in a plano-concave shape having an object-side surface being flat and an image-side surface being concave in a paraxial region (near the optical axis X). Therefore, a wide field of view is achieved and astigmatism and distortion are suppressed by strengthening the refractive power. Furthermore, when the object-side surface is flat in the paraxial region, the astigmatism and the distortion can be suppressed by an aspheric surface on the object side without affecting a focal length of the overall optical system of the imaging lens.

Figure 5:
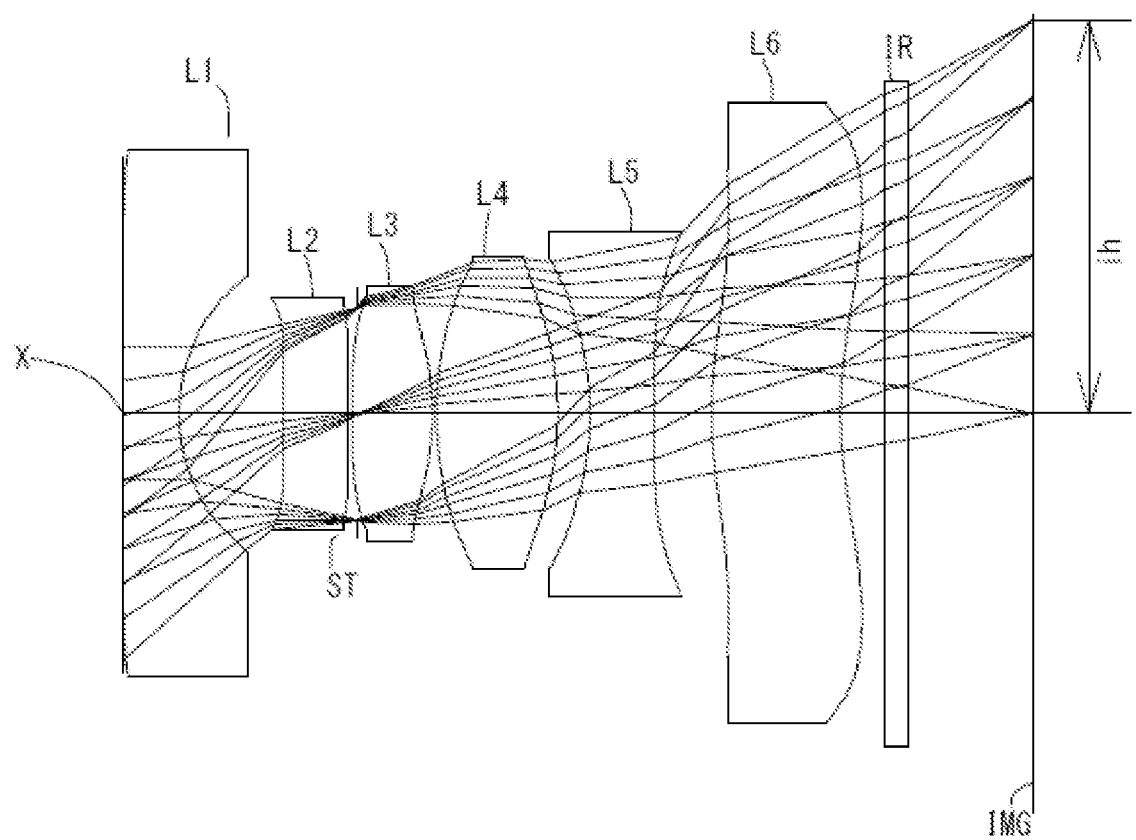
FIG. 5 is a schematic view showing an imaging lens in Example 3 according to the present invention.
Figure 7:
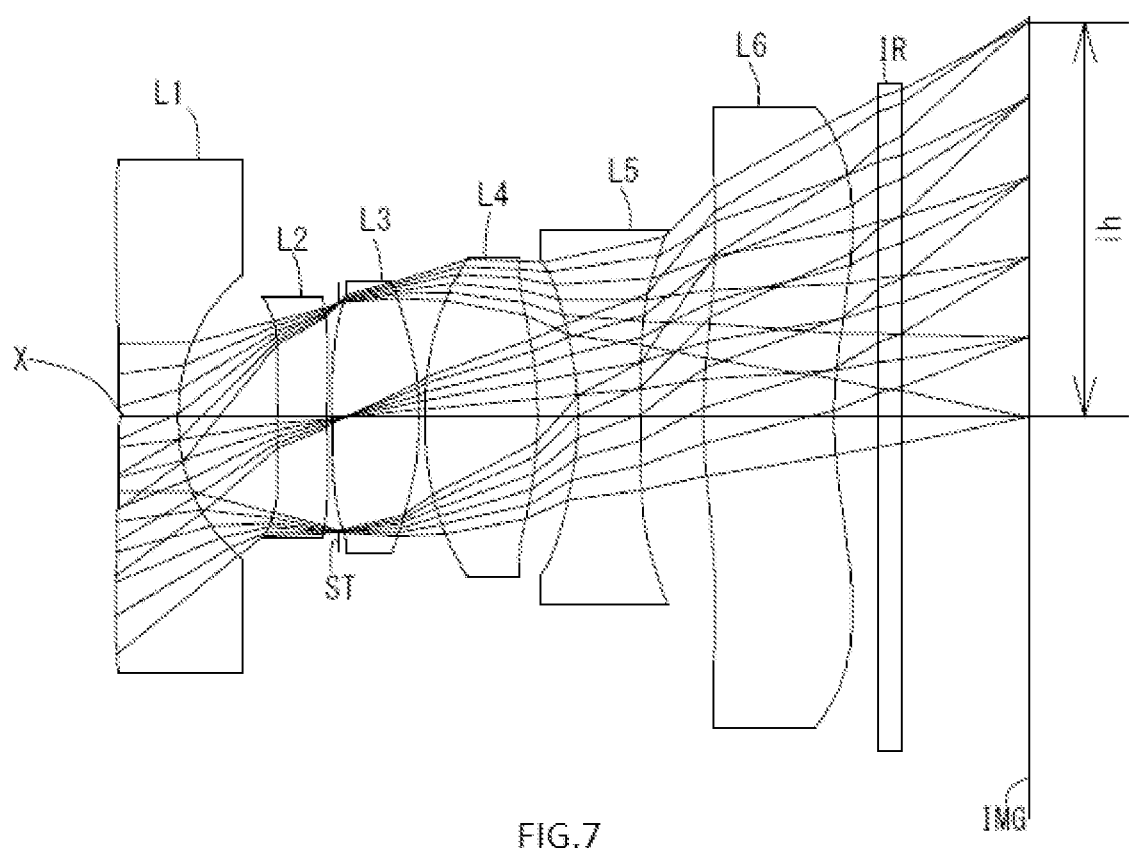
FIG. 7 is a schematic view showing an imaging lens in Example 4 according to the present invention.
Figure 9:
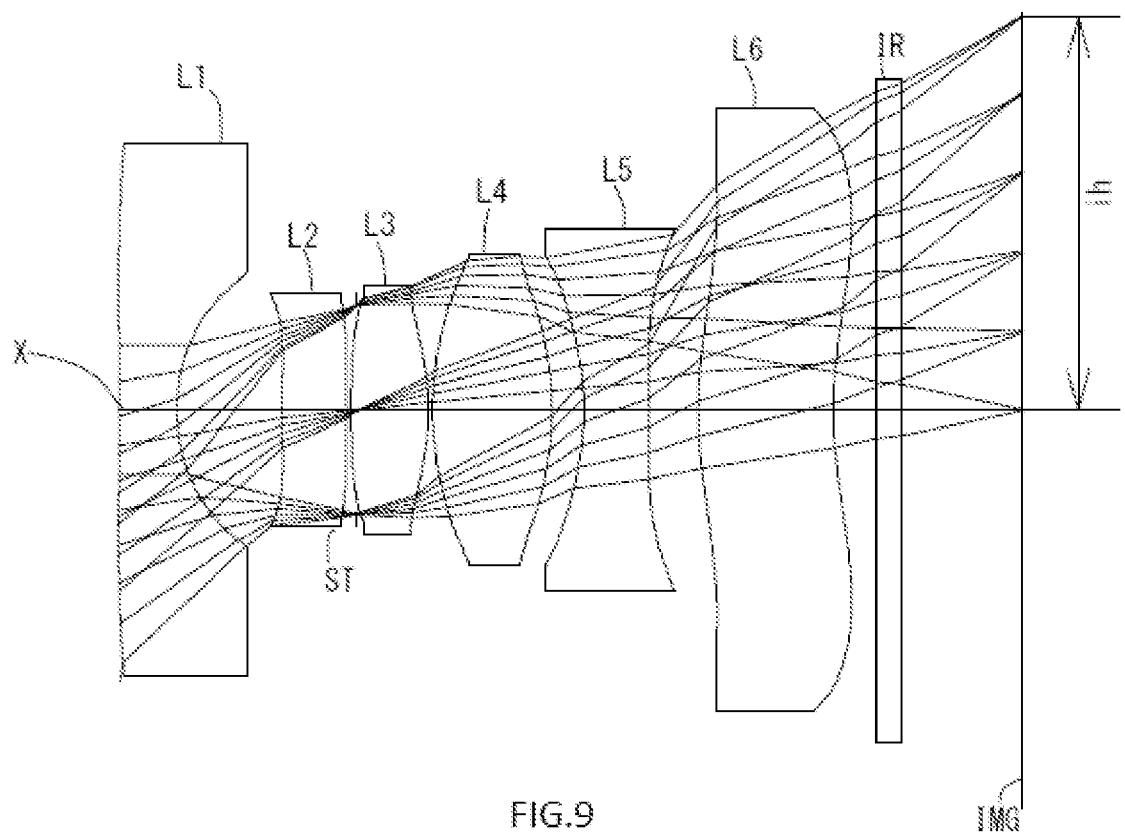
FIG. 9 is a schematic view showing an imaging lens in Example 5 according to the present invention.

The first lens L1 may be formed in a biconcave shape having the object-side surface and the image-side surface being both concave in the paraxial region (near the optical axis X) as in the Examples 3, 4 and 5 shown in FIGS. 5, 7 and 9. In this case, the wide field of view is favorably made by the negative refractive powers on both sides.

The second lens L2 has the positive refractive power and is formed in a biconvex shape having an object-side surface and an image-side surface being both convex in a paraxial region (near the optical axis X). Therefore, reduction in a profile is achieved and coma aberration, the astigmatism and the distortion are properly corrected. When the object-side surface is convex in the paraxial region, the coma aberration and the astigmatism are more properly corrected.

The second lens L2 may be formed in a meniscus shape having the object-side surface being convex and the image-side surface being concave in the paraxial region (near the optical axis X) as in the Examples 3, 4, 5, 6 and 7 shown in FIGS. 5, 7, 9, 11 and 13. In this case, the distortion can be properly corrected.

The third lens L3 has the positive refractive power and is formed in a meniscus shape having an object-side surface being concave and an image-side surface being convex in a paraxial region (near the optical axis X). Therefore, reduction in the profile is achieved and the spherical aberration, the coma aberration, the field curvature, and the distortion are properly corrected.

The third lens L3 may be formed in a biconvex shape having the object-side surface being convex and the image-side surface being convex in the paraxial region (near the optical axis X) as in the Examples 3, 4, 5, 6 and 7 shown in FIGS. 5, 7, 9, 11 and 13. In this case, reduction in the profile is favorably made by the positive refractive powers on both sides.

The fourth lens L4 has the positive refractive power and is formed in a biconvex shape having an object-side surface being convex and an image-side surface being convex in a paraxial region (near the optical axis X). Therefore, the astigmatism, the field curvature, and the distortion are properly corrected.

Figure 13:
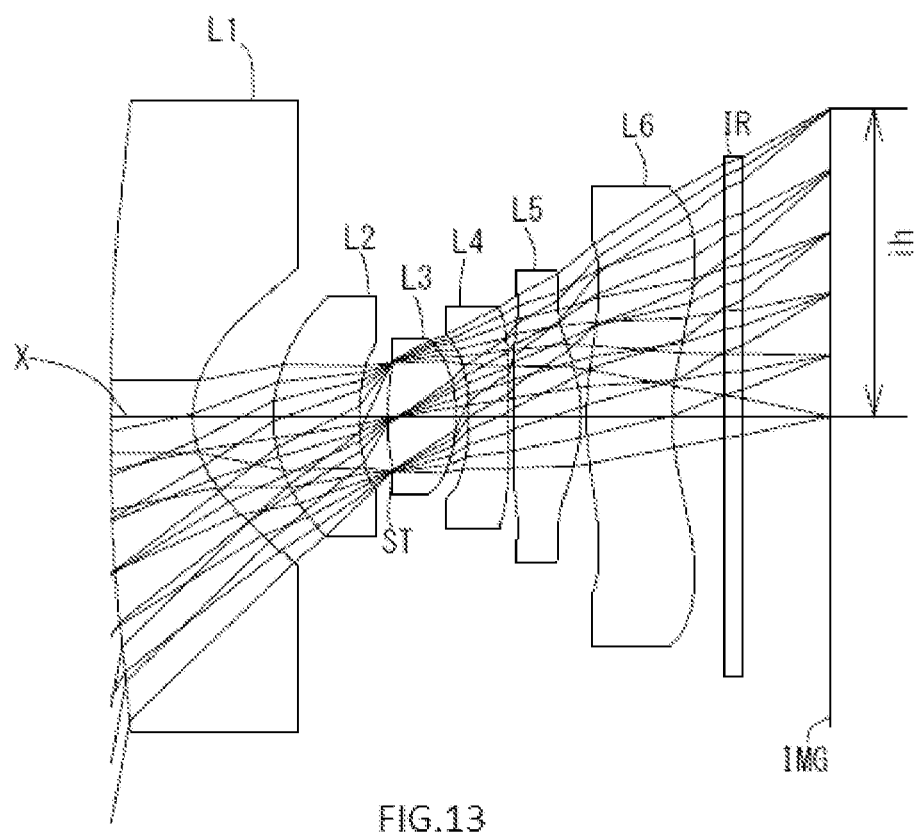
FIG. 13 is a schematic view showing an imaging lens in Example 7 according to the present invention.

The fourth lens L4 may have negative refractive power as in the Example 7 shown in FIG. 13. In this case, correction of the chromatic aberration is favorably made.

Figure 11:
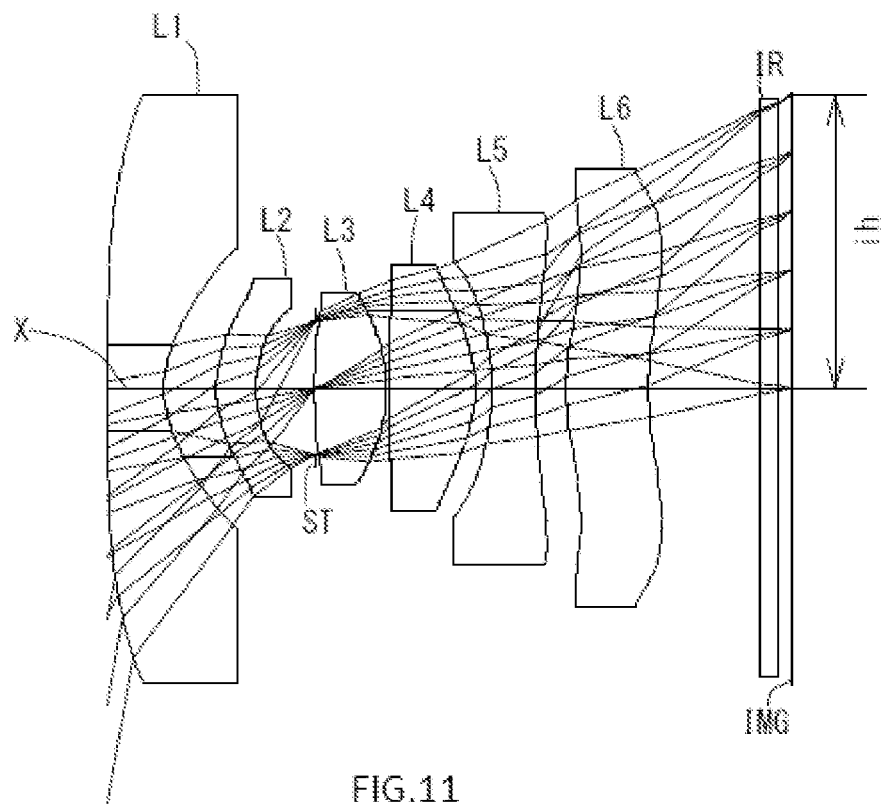
FIG. 11 is a schematic view showing an imaging lens in Example 6 according to the present invention.

The fourth lens L4 may be formed in a meniscus shape having the object-side surface being concave and the image-side surface being convex in the paraxial region (near the optical axis X) as in the Example 6 shown in FIG. 11. In this case, the field curvature and the distortion can be properly corrected. Furthermore, the fourth lens L4 may be formed in a biconcave shape having the object-side surface being concave and the image-side surface being concave in the paraxial region as in the Example 7 shown in FIG. 13. In this case, the chromatic aberration can be properly corrected by the negative refractive power on the both sides.

The fifth lens L5 has negative refractive power, and is formed in a biconcave shape having the object-side surface being concave and the image-side surface being concave in a paraxial region. Therefore, the coma aberration, the astigmatism, and the distortion are properly corrected. Furthermore, when the fifth lens L5 has the object-side surface being concave in the paraxial region, the astigmatism and the distortion are more properly corrected.

The fifth lens L5 may have positive refractive power as in the Example 7 shown in FIG. 13. In this case, reduction in the profile is favorably made.

The fifth lens L5 may be formed in a meniscus shape having the object-side surface being concave and the image-side surface being convex in the paraxial region as in the Examples 3, 5 and 7 shown in FIGS. 5, 9 and 13. In this case, the distortion can be properly corrected.

The sixth lens L6 has positive refractive power, and is formed in a meniscus shape having the object-side surface being convex and the image-side surface being concave in a paraxial region. Therefore, the astigmatism, the field curvature and the distortion are properly corrected. Furthermore, when the sixth lens L6 has the image-side surface being concave in the paraxial region, a low profile is maintained and a back focus is secured.

The sixth lens L6 may have negative refractive power as in the Examples 4 and 7 shown in FIGS. 7 and 13. In this case, correction of the chromatic aberration is favorably made.

Regarding the imaging lens according to the present embodiments, it is preferable that all lenses of the first lens L1 to the sixth lens L6 are single lenses. Configuration only with the single lenses can frequently use the aspheric surfaces. In the present embodiments, all lens surfaces are formed as appropriate aspheric surfaces, and the aberrations are favorably corrected. Furthermore, in comparison with the case in which a cemented lens is used, workload is reduced, and manufacturing in low cost becomes possible.

Furthermore, the imaging lens according to the present embodiments makes manufacturing facilitated by using a plastic material for all lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effect by satisfying the following conditional expressions (1) to (18).

$$0.20 < vd2/vd6 < 0.60 \quad (1)$$

$$12.50 < |f6|/D6 < 90.00 \quad (2)$$

$$2.50 < r12/r2/D6 < 7.00 \quad (3)$$

$$5.25 < |f6|/f < 50.00 \quad (4)$$

$$-45.00 < |f6|/f1 < -5.00 \quad (5)$$

$$-0.95 < r2/r6 < -0.40 \quad (6)$$

$$-1.00 < r6/r12 < -0.25 \quad (7)$$

$$0.75 < r12/f < 2.00 \quad (8)$$

$$0.20 < T4/T5 < 1.70 \quad (9)$$

$$2.50 < f3/D3 < 8.00 \quad (10)$$

$$0.50 < |f5|/f < 2.00 \quad (11)$$

$$-1.00 < f1/|f5| < -0.30 \quad (12)$$

$$0.25 < f3/|f4| < 1.80 \quad (13)$$

$$-4.50 < r6/D3 < -1.65 \quad (14)$$

$$0.35 < |r8|/r11 < 8.50 \quad (15)$$

$$-28.50 < r9/f < -0.40 \quad (16)$$

$$0.70 < r11/f < 2.50 \quad (17)$$

$$1.50 < r12/r2 < 3.30 \quad (18)$$

where vd2: an abbe number at d-ray of the second lens, vd6: an abbe number at d-ray of the sixth lens, D3: a thickness along the optical axis of the third lens, D6: a thickness along the optical axis of the sixth lens, T4: a distance along the optical axis from an image-side surface of the fourth lens to an object-side surface of the fifth lens, T5: a distance along the optical axis from an image-side surface of the fifth lens to an object-side surface of the sixth lens, f: a focal length of the overall optical system of the imaging lens, f1: a focal length of the first lens, f3: a focal length of the third lens, f4: a focal length of the fourth lens, f5: a focal length of the fifth lens, f6: a focal length of the sixth lens, r2: a paraxial curvature radius of an image-side surface of the first lens, r6: a paraxial curvature radius of an image-side surface of the third lens, r8: a paraxial curvature radius of an image-side surface of the fourth lens, r9: a paraxial curvature radius of an object-side surface of the fifth lens, r11: a paraxial curvature radius of an object-side surface of the sixth lens, and r12: a paraxial curvature radius of an image-side surface of the sixth lens.

It is not necessary to satisfy the above all conditional expressions, and by satisfying the conditional expression individually, operational advantage corresponding to each conditional expression can be obtained.

The imaging lens according to the present embodiments shows further preferable effect by satisfying the following conditional expressions (1a) to (18a).

$$0.30 < vd2/vd6 < 0.50 \quad (1a)$$

$$15.50 < |f6|/D6 < 85.50 \quad (2a)$$

$$3.00 < r12/r2/D6 < 6.00 \quad (3a)$$

$$6.10 < |f6|/f < 43.50 \quad (4a)$$

$$-40.00 < |f6|/f1 < -6.00 \quad (5a)$$

$$-0.85 < r2/r6 < -0.50 \quad (6a)$$

$$-0.90 < r6/r12 < -0.40 \quad (7a)$$

$$0.95 < r12/f < 1.70 \quad (8a)$$

$$0.30 < T4/T5 < 1.40 \quad (9a)$$

$$2.85 < f3/D3 < 7.00 \quad (10a)$$

$$1.00 < |f5|/f < 1.80 \quad (11a)$$

$$-0.85 < f1/|f5| < -0.50 \quad (12a)$$

$$0.40 < f3/|f4| < 1.60 \quad (13a)$$

$$-4.00 < r6/D3 < -1.90 \quad (14a)$$

$$0.50 < |r8|/r11 < 7.00 \quad (15a)$$

$$-25.00 < r9/f < -0.65 \quad (16a)$$

$$0.90 < r11/f < 2.00 \quad (17a)$$

$$1.75 < r12/r2 < 2.90 \quad (18a)$$

The signs in the above conditional expressions have the same meanings as those in the paragraph before the preceding paragraph.

In this embodiment, the aspheric shapes of the aspheric surfaces of the lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14 and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \{Equation\ 1\}$$

Next, examples of the imaging lens according to this embodiment will be explained. In each example, f denotes a focal length of the overall optical system of the imaging lens, Fno denotes an F-number, ω denotes a half field of view, ih denotes a maximum image height, and TTL denotes a total track length. Additionally, i denotes a surface number counted from the object side, r denotes a paraxial curvature radius, d denotes a distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

Example 1
Unit mm
f = 1.51
Fno = 2.44
ω(°) = 74.9
ih = 1.81
TTL = 4.17

Surface Data

| i | r | d | Nd | vd |
|---|---|---|---|---|
| (Object) | Infinity | Infinity | | |
| 1* | Infinity | 0.2965 | 1.544 | 55.93 (vd1) |
| 2* | 0.8439 | 0.4986 | | |
| 3* | 23.5210 | 0.2113 | 1.671 | 19.24 (vd2) |
| 4* | −13.5835 | 0.0099 | | |
| 5 (Stop) | Infinity | 0.0162 | | |
| 6* | −454.0527 | 0.4100 | 1.535 | 55.69 (vd3) |
| 7* | −1.1720 | 0.0200 | | |
| 8* | 1.6368 | 0.5863 | 1.544 | 55.93 (vd4) |
| 9* | −1.5977 | 0.1345 | | |
| 10* | −1.5211 | 0.3179 | 1.661 | 20.37 (vd5) |
| 11* | 12.9797 | 0.2514 | | |
| 12* | 1.8460 | 0.5399 | 1.535 | 55.69 (vd6) |
| 13* | 1.8022 | 0.2000 | | |
| 14 | Infinity | 0.1100 | 1.517 | 64.20 |
| 15 | Infinity | 0.6032 | | |
| Image Plane | Infinity | | | |

TABLE 1-continued

Example 1
Unit mm
f = 1.51
Fno = 2.44
ω(°) = 74.9
ih = 1.81
TTL = 4.17

Constituent Lens Data

| Lens | Start Surface | Focal Length |
|---|---|---|
| 1 | 1 | −1.550 |
| 2 | 3 | 12.867 |
| 3 | 6 | 2.196 |
| 4 | 8 | 1.587 |
| 5 | 10 | −2.043 |
| 6 | 12 | 43.075 |

Aspheric Surface Data

| | First Surface | Second Surface | Third Surface | Fourth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 2.451649E−02 | 8.076241E−02 | −8.789706E−01 | −4.551724E−01 | 4.616579E−01 | 7.363679E−02 |
| A6 | −4.175040E−03 | 8.080015E−01 | −2.210783E+00 | −5.059716E−01 | 3.347414E−01 | −1.211120E−01 |
| A8 | 5.196115E−03 | −2.397090E+00 | 7.390808E+00 | −7.874408E−02 | −1.443685E+00 | 1.476578E+00 |
| A10 | −1.266216E−03 | 2.754740E+00 | −1.205394E+01 | 2.139074E+01 | −1.270886E+00 | −3.350538E+00 |
| A12 | −3.977811E−03 | 1.990203E+01 | −2.328998E+01 | −6.612154E+01 | 9.819865E+00 | 8.608011E−01 |
| A14 | 3.468831E−03 | −4.179640E+01 | 8.983577E+01 | −3.725776E+01 | 2.201802E+00 | 1.538152E+00 |
| A16 | −7.622475E−04 | −1.582544E+01 | 6.051289E+01 | 3.631082E+02 | −2.227086E+01 | 1.361522E+01 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −3.135213E−02 | −1.848025E−01 | −1.269748E−01 | 1.542528E−01 | −3.228909E−01 | −2.596074E−01 |
| A6 | 1.492622E−01 | 2.329788E−01 | 8.026448E−02 | 1.289231E−01 | 2.021077E−01 | 9.503581E−02 |
| A8 | −5.943150E−01 | 2.821754E−01 | −4.213837E−01 | −1.025661E−01 | −9.852645E−02 | −3.118325E−02 |
| A10 | 9.901759E−01 | −4.184566E−01 | 9.491980E−01 | −6.168690E−02 | 6.143182E−02 | 5.480682E−03 |
| A12 | −4.002359E−01 | 1.387003E−01 | −7.996289E−01 | −6.348498E−02 | −4.082142E−02 | −1.922936E−03 |
| A14 | −6.400555E−02 | 1.123875E−01 | −3.362293E−01 | 7.152380E−02 | 1.830760E−03 | 8.650699E−05 |
| A16 | 3.300000E−01 | 2.459459E−01 | −1.932866E−01 | 3.598390E−02 | 4.603349E−03 | 2.420641E−05 |

The imaging lens in Example 1 satisfies conditional expressions (1) to (18) as shown in Table 8.

Figure 1:
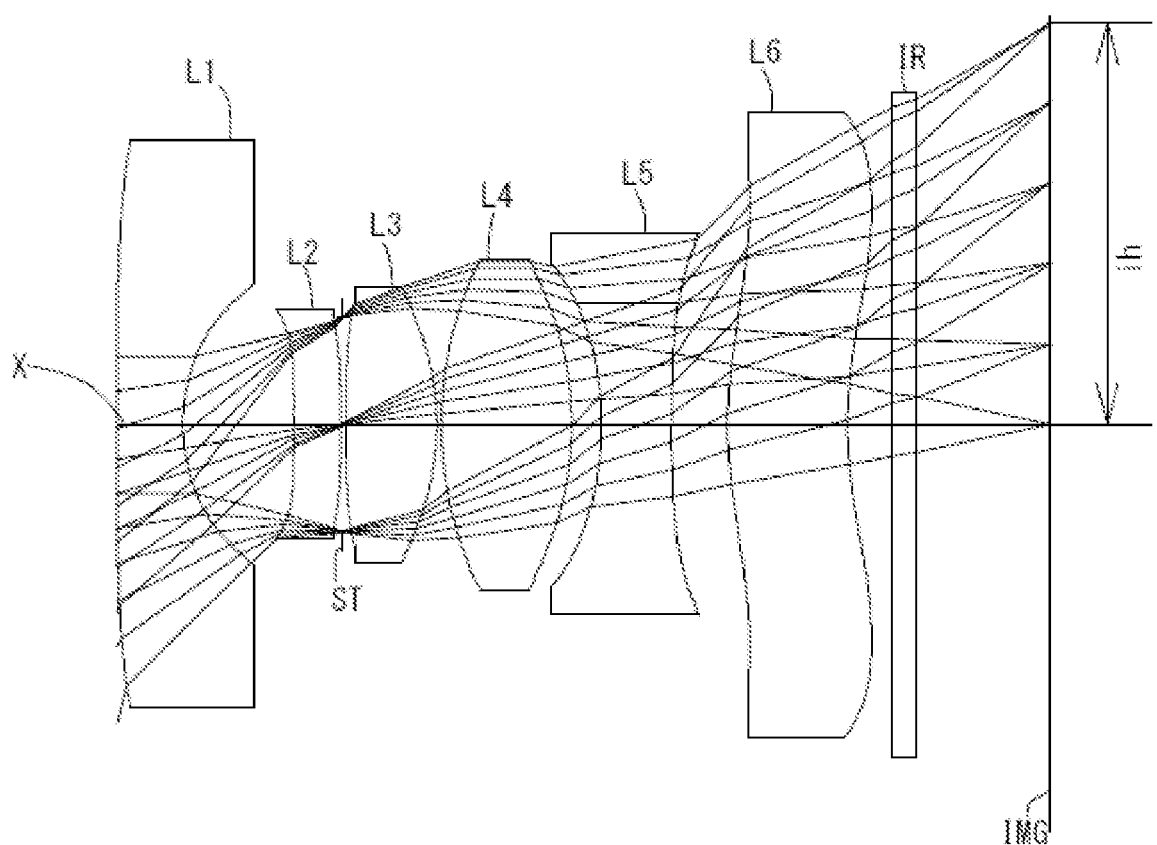
FIG. 1 is a schematic view showing an imaging lens in Example 1 according to the present invention.
Figure 2:
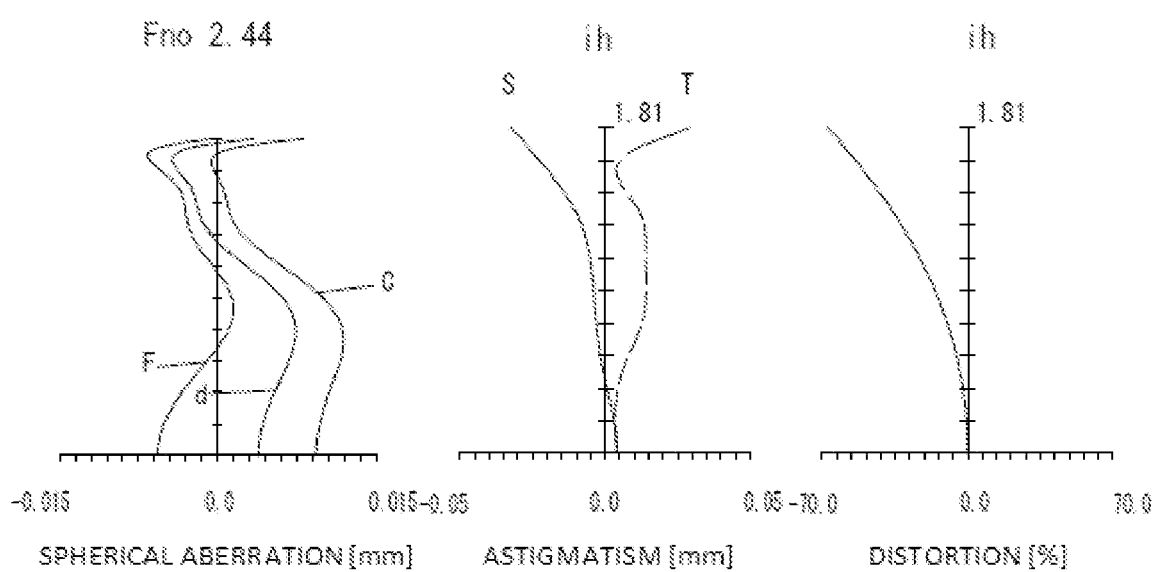
FIG. 2 shows spherical aberration, astigmatism, and distortion of the imaging lens in Example 1 according to the present invention.
Figure 3:
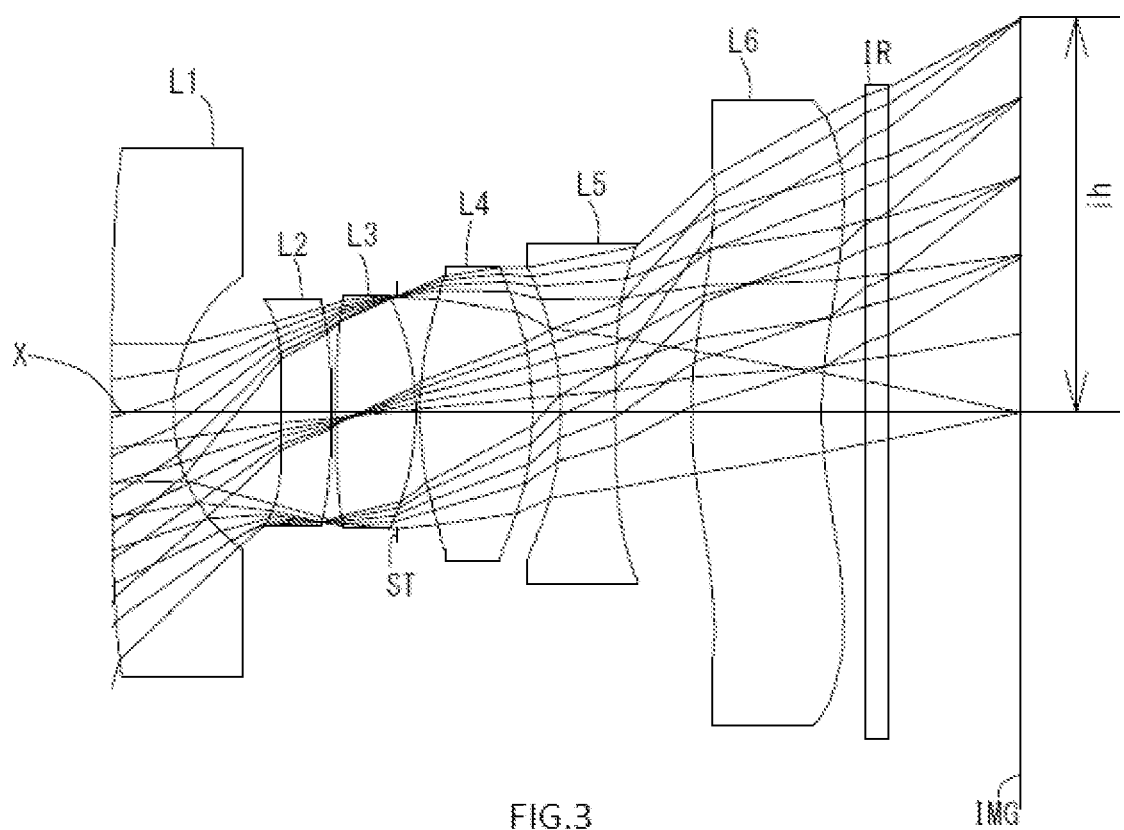
FIG. 3 is a schematic view showing an imaging lens in Example 2 according to the present invention.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm). The astigmatism diagram shows the amount of aberration at d-ray on a sagittal image surface S (solid line) and the amount of aberration at d-ray on tangential image surface T (broken line), respectively (same as FIGS. 4, 6, 8, 10, 12 and 14). As shown in FIG. 2, each aberration is corrected excellently.

Example 2

The basic lens data is shown below in Table 2.

TABLE 2

Example 2
Unit mm
f = 1.56
Fno = 2.44
ω(°) = 74.9
ih = 1.81
TTL = 4.16

Surface Data

| i | r | d | Nd | vd |
|---|---|---|---|---|
| (Object) | Infinity | Infinity | | |
| 1* | Infinity | 0.2827 | 1.544 | 55.93 (vd1) |
| 2* | 0.8571 | 0.4966 | | |
| 3* | 26.5181 | 0.2300 | 1.671 | 19.24 (vd2) |
| 4* | −9.4120 | 0.0254 | | |
| 5* | −36.5464 | 0.3657 | 1.535 | 55.69 (vd3) |
| 6* | −1.1886 | −0.0893 | | |
| 7 (Stop) | Infinity | 0.1093 | | |
| 8* | 1.6726 | 0.5149 | 1.544 | 55.93 (vd4) |
| 9* | −1.7248 | 0.1312 | | |

TABLE 2-continued

Example 2
Unit mm
f = 1.56
Fno = 2.44
ω(°) = 74.9
ih = 1.81
TTL = 4.16

| | | | | |
|---|---|---|---|---|
| 10* | −1.6775 | 0.2540 | 1.661 | 20.37 (vd5) |
| 11* | 9.2620 | 0.3515 | | |
| 12* | 1.8169 | 0.5994 | 1.535 | 55.69 (vd6) |
| 13* | 1.8742 | 0.2000 | | |
| 14 | Infinity | 0.1100 | 1.517 | 64.20 |
| 15 | Infinity | 0.6112 | | |
| Image Plane | Infinity | | | |

Constituent Lens Data

| Lens | Start Surface | Focal Length |
|---|---|---|
| 1 | 1 | −1.575 |
| 2 | 3 | 10.383 |
| 3 | 5 | 2.289 |
| 4 | 8 | 1.648 |
| 5 | 10 | −2.130 |
| 6 | 12 | 23.914 |

Aspheric Surface Data

| | First Surface | Second Surface | Third Surface | Fourth Surface | Fifth Surface | Sixth Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 2.392219E−02 | 1.036358E−01 | −8.532409E−01 | −4.660641E−01 | 4.617597E−01 | 9.119539E−02 |
| A6 | −4.430133E−03 | 8.785458E−01 | −2.199725E+00 | −5.402284E−01 | 3.591807E−01 | −8.614276E−02 |
| A8 | 4.844066E−03 | −2.484113E+00 | 7.175694E+00 | −1.790582E−01 | −1.340957E+00 | 1.360568E+00 |
| A10 | −1.563823E−03 | 2.651993E+00 | −1.255710E+01 | 2.160778E+01 | −1.767355E+00 | −4.040194E+00 |
| A12 | −4.211635E−03 | 1.951556E+01 | −2.046596E+01 | −6.356835E+01 | 6.411880E+00 | −1.117594E+00 |
| A14 | 3.536781E−03 | −3.956064E+01 | 1.071776E+02 | −2.485835E+01 | −6.857459E+00 | −4.908893E−01 |
| A16 | −6.913156E−04 | −1.770514E+01 | −2.731939E+00 | 2.807331E+02 | 7.080177E+00 | 1.605611E+01 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −4.430769E−02 | −2.027804E−01 | −1.147122E−01 | 1.652743E−01 | −3.173237E−01 | −2.557944E−01 |
| A6 | 8.800290E−02 | 2.135440E−01 | 6.556013E−02 | 1.288818E−01 | 1.984801E−01 | 9.387192E−02 |
| A8 | −6.299358E−01 | 3.012335E−01 | −3.292123E−01 | −1.335148E−01 | −1.030667E−01 | −3.001033E−02 |
| A10 | 8.302111E−01 | −3.408574E−01 | 1.169337E+00 | −9.452518E−02 | 6.104696E−02 | 6.034214E−03 |
| A12 | −4.055238E−01 | 2.602568E−01 | −7.489600E−01 | −3.138005E−02 | −3.850738E−02 | −1.893832E−03 |
| A14 | 2.336965E−01 | 1.002598E−01 | −6.070228E−01 | 1.716430E−01 | 3.421267E−03 | 3.579695E−05 |
| A16 | −2.722468E+00 | −9.604670E−01 | 1.158893E+00 | 1.306156E−02 | 3.191152E−03 | 4.920929E−05 |

The imaging lens in Example 2 satisfies conditional expressions (1) to (18) as shown in Table 8.

Figure 4:
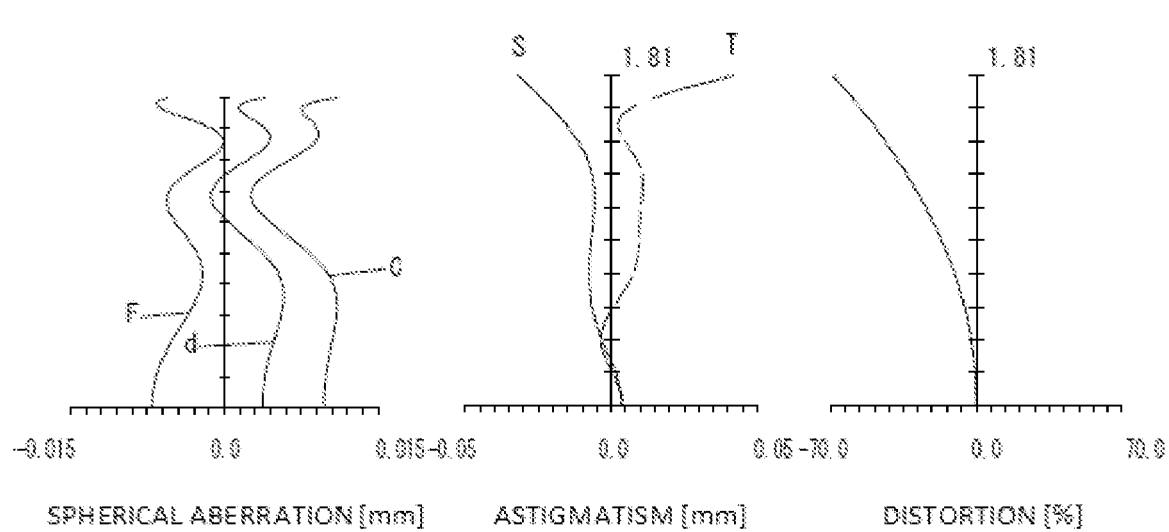
FIG. 4 shows spherical aberration, astigmatism, and distortion of the imaging lens in Example 2 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Example 3
Unit mm
f = 1.50
Fno = 2.44
ω(°) = 75.0
ih = 1.81
TTL = 4.13

Surface Data

| i | r | d | Nd | vd |
|---|---|---|---|---|
| (Object) | Infinity | Infinity | | |
| 1* | −15.7782 | 0.2573 | 1.544 | 55.93 (vd1) |
| 2* | 0.8571 | 0.4753 | | |

TABLE 3-continued

Example 3
Unit mm
f = 1.50
Fno = 2.44
ω(°) = 75.0
ih = 1.81
TTL = 4.13

| | | | | |
|---|---|---|---|---|
| 3* | 5.3716 | 0.2934 | 1.671 | 19.24 (vd2) |
| 4* | 8.8138 | 0.0397 | | |
| 5 (Stop) | Infinity | −0.0179 | | |
| 6* | 6.3437 | 0.3660 | 1.535 | 55.69 (vd3) |
| 7* | −1.2829 | 0.0200 | | |
| 8* | 1.6142 | 0.5538 | 1.544 | 55.93 (vd4) |
| 9* | −1.5129 | 0.1491 | | |
| 10* | −1.3033 | 0.2960 | 1.661 | 20.37 (vd5) |
| 11* | −55.1172 | 0.2602 | | |
| 12* | 1.8403 | 0.5910 | 1.535 | 55.69 (vd6) |
| 13* | 1.8187 | 0.2000 | | |
| 14 | Infinity | 0.1100 | 1.517 | 64.20 |
| 15 | Infinity | 0.5736 | | |
| Image Plane | Infinity | | | |

Constituent Lens Data

| Lens | Start Surface | Focal Length |
|---|---|---|
| 1 | 1 | −1.485 |
| 2 | 3 | 19.827 |
| 3 | 6 | 2.029 |
| 4 | 8 | 1.530 |
| 5 | 10 | −2.025 |
| 6 | 12 | 33.957 |

Aspheric Surface Data

| | First Surface | Second Surface | Third Surface | Fourth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 7.100101E−02 | 5.148214E−02 | −6.631478E−01 | −4.955781E−01 | 2.860711E−01 | 2.045092E−01 |
| A6 | −7.175472E−02 | 1.559189E+00 | −1.850658E+00 | −1.304814E−01 | 1.136973E+00 | 1.015554E−02 |
| A8 | 5.041496E−02 | −6.871485E+00 | 5.899515E+00 | 6.626358E−01 | −7.961507E−01 | 2.769422E+00 |
| A10 | −1.211133E−02 | 1.093987E+01 | −1.267524E+01 | 9.497125E+00 | −3.273786E+00 | −2.566913E+00 |
| A12 | −5.047186E−03 | 1.814667E+01 | −1.460447E+01 | −5.985966E+01 | 6.748977E+00 | 1.101432E+00 |
| A14 | 3.045537E−03 | −5.477241E+01 | 7.666611E+01 | 6.866293E+01 | −3.731544E+00 | −1.108949E+00 |
| A16 | −1.927037E−04 | 5.664552E+00 | −2.425750E+01 | 7.676789E+01 | 2.955817E+00 | 1.264768E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −3.426587E−02 | 1.011078E−02 | 2.806826E−01 | 3.101621E−01 | −4.938943E−01 | −3.455138E−01 |
| A6 | 7.480559E−01 | −4.296558E−01 | 3.891458E−01 | 4.042008E−01 | 9.032333E−01 | 3.223566E−01 |
| A8 | −7.950893E+00 | 2.376958E+00 | −8.228757E+00 | −2.019873E+00 | −1.803445E+00 | −3.193474E−01 |
| A10 | 4.650742E+01 | −9.460228E−01 | 4.115442E+01 | 5.090251E+00 | 2.562828E+00 | 1.923516E−01 |
| A12 | −1.385378E+02 | −9.733178E+00 | −1.043808E+02 | −9.063464E+00 | −2.191142E+00 | −5.751701E−02 |
| A14 | 2.063263E+02 | 2.177632E+01 | 1.265045E+02 | 8.956265E+00 | 9.866332E−01 | 2.854825E−03 |
| A16 | −1.250297E+02 | −1.555350E+01 | −5.756945E+01 | −3.548119E+00 | −1.784622E−01 | 1.316520E−03 |

The imaging lens in Example 3 satisfies conditional expressions (1) to (18) as shown in Table 8.

Figure 6:
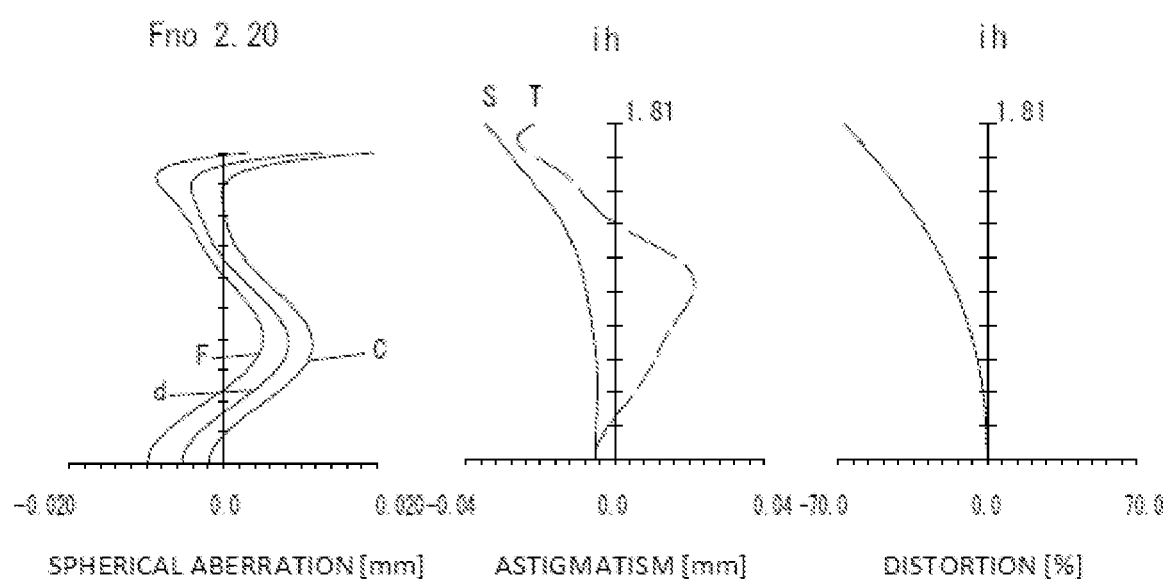
FIG. 6 shows spherical aberration, astigmatism, and distortion of the imaging lens in Example 3 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example 4
Unit mm
f = 1.65
Fno = 2.44
ω(°) = 70.0
ih = 1.81
TTL = 4.11

Surface Data

| i | r | d | Nd | vd |
|---|---|---|---|---|
| (Object) | Infinity | Infinity | | |
| 1* | −11.5875 | 0.2676 | 1.544 | 55.93 (vd1) |
| 2* | 0.9594 | 0.4499 | | |
| 3* | 4.5458 | 0.2300 | 1.671 | 19.24 (vd2) |
| 4* | 6.5793 | 0.0529 | | |
| 5 (Stop) | Infinity | −0.0329 | | |
| 6* | 6.2951 | 0.4023 | 1.535 | 55.69 (vd3) |
| 7* | −1.3361 | 0.0200 | | |
| 8* | 1.5672 | 0.5185 | 1.544 | 55.93 (vd4) |
| 9* | −1.7466 | 0.1818 | | |
| 10* | −1.5182 | 0.2847 | 1.661 | 20.37 (vd5) |
| 11* | 37.9382 | 0.2877 | | |
| 12* | 2.3197 | 0.5969 | 1.535 | 55.69 (vd6) |
| 13* | 1.9383 | 0.2000 | | |
| 14 | Infinity | 0.1100 | 1.517 | 64.20 |
| 15 | Infinity | 0.5749 | | |
| Image Plane | Infinity | | | |

Constituent Lens Data

| Lens | Start Surface | Focal Length |
|---|---|---|
| 1 | 1 | −1.616 |
| 2 | 3 | 20.975 |
| 3 | 6 | 2.099 |
| 4 | 8 | 1.606 |
| 5 | 10 | −2.203 |
| 6 | 12 | −48.463 |

Aspheric Surface Data

| | First Surface | Second Surface | Third Surface | Fourth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 5.345216E−02 | 9.628096E−02 | −7.522911E−01 | −5.143429E−01 | 3.134858E−01 | 8.122856E−02 |
| A6 | −5.450862E−02 | 1.102575E+00 | −1.675847E+00 | −1.382062E−01 | 8.272075E−01 | −1.297804E−01 |
| A8 | 4.242581E−02 | −4.526281E+00 | 4.159393E+00 | 4.747769E−01 | −1.042191E+00 | 1.915831E+00 |
| A10 | −7.315434E−03 | 8.557244E+00 | −6.005637E+00 | 7.178747E+00 | −3.140778E+00 | −2.022732E+00 |
| A12 | −6.569653E−03 | 9.701503E+00 | −1.684052E+01 | −3.374246E+01 | 4.939804E+00 | −2.517160E+00 |
| A14 | 2.117053E−03 | −4.023139E+01 | 5.241655E+01 | 2.398595E+01 | 8.115706E+00 | −6.449434E+00 |
| A16 | 4.470033E−04 | 8.669822E+00 | −3.265422E+00 | 6.225370E+01 | −6.968896E+00 | 3.033493E+01 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −5.026316E−04 | 1.067815E−01 | 2.093177E−01 | 2.830047E−01 | −4.184116E−01 | −3.247362E−01 |
| A6 | 6.361957E−01 | −2.747749E−01 | 3.308405E−01 | 3.196040E−01 | 7.214858E−01 | 2.613062E−01 |
| A8 | −5.699068E+00 | 1.884153E+00 | −5.857396E+00 | −1.481587E+00 | −1.288519E+00 | −2.295418E−01 |
| A10 | 3.025462E+01 | −1.521687E−01 | 2.676010E+01 | 3.253907E+00 | 1.666974E+00 | 1.243583E−01 |
| A12 | −8.176396E+01 | −5.524559E+00 | −6.175589E+01 | −5.368990E+00 | −1.297753E+00 | −3.420588E−02 |
| A14 | 1.101365E+02 | 1.092904E+01 | 6.779831E+01 | 4.883275E+00 | 5.300873E−01 | 1.588775E−03 |
| A16 | −6.079460E+01 | −1.076450E+01 | −2.917363E+01 | −1.711509E+00 | −8.654024E−02 | 7.266033E−04 |

The imaging lens in Example 4 satisfies conditional expressions (1) to (18) as shown in Table 8.

Figure 8:
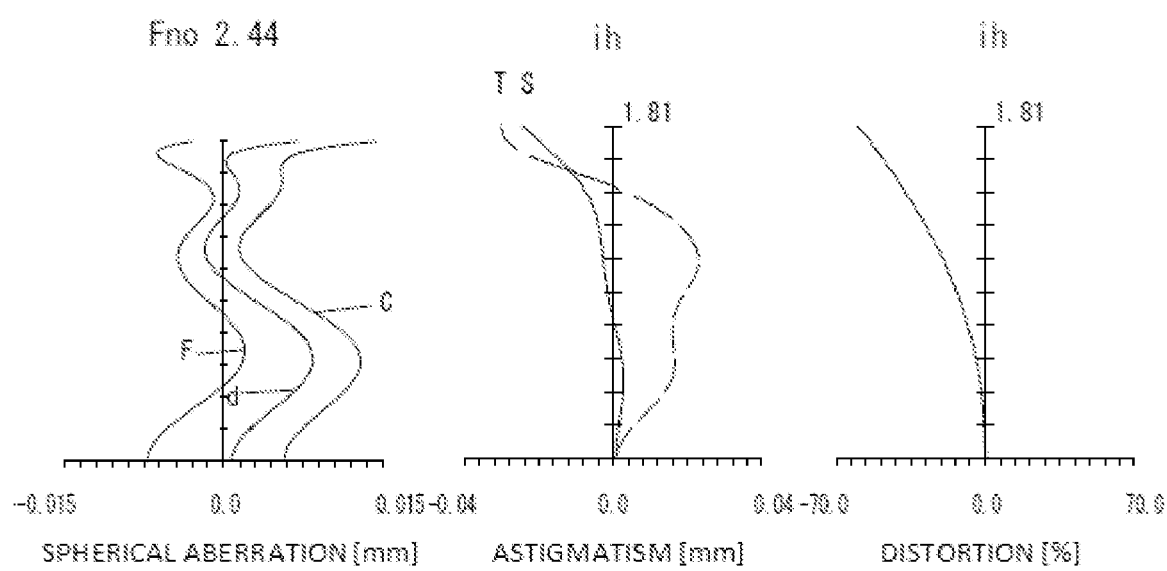
FIG. 8 shows spherical aberration, astigmatism, and distortion of the imaging lens in Example 4 according to the present invention.

FIG. 8 shows spherical aberration (mm), astigmatism (mm), and distortion (%) of the imaging lens in Example 4. As shown in FIG. 8, each aberration is corrected excellently.

Example 5

The basic lens data is shown below in Table 5.

TABLE 5

Example 5
Unit mm
f = 1.46
Fno = 2.44
ω(°) = 79.9
ih = 1.81
TTL = 4.12

Surface Data

| i | r | d | Nd | vd |
|---|---|---|---|---|
| (Object) | Infinity | Infinity | | |
| 1* | −16.2094 | 0.2647 | 1.544 | 55.93 (vd1) |
| 2* | 0.8479 | 0.4834 | | |
| 3* | 5.6089 | 0.2915 | 1.671 | 19.24 (vd2) |
| 4* | 9.2790 | 0.0469 | | |
| 5 (Stop) | Infinity | −0.0206 | | |
| 6* | 6.4540 | 0.3563 | 1.535 | 55.69 (vd3) |
| 7* | −1.2793 | 0.0200 | | |
| 8* | 1.5913 | 0.5481 | 1.544 | 55.93 (vd4) |
| 9* | −1.5308 | 0.1486 | | |
| 10* | −1.3089 | 0.2972 | 1.661 | 20.37 (vd5) |
| 11* | −72.5927 | 0.2279 | | |
| 12* | 1.8134 | 0.6218 | 1.535 | 55.69 (vd6) |
| 13* | 1.8634 | 0.2000 | | |
| 14 | Infinity | 0.1100 | 1.517 | 64.20 |
| 15 | Infinity | 0.5606 | | |
| Image Plane | Infinity | | | |

Constituent Lens Data

| Lens | Start Surface | Focal Length |
|---|---|---|
| 1 | 1 | −1.472 |
| 2 | 3 | 20.488 |
| 3 | 6 | 2.029 |
| 4 | 8 | 1.528 |
| 5 | 10 | −2.021 |
| 6 | 12 | 23.694 |

Aspheric Surface Data

| | First Surface | Second Surface | Third Surface | Fourth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 7.250870E−02 | 7.651629E−02 | −6.612928E−01 | −5.352598E−01 | 2.878082E−01 | 2.386193E−01 |
| A6 | −7.122783E−02 | 1.595511E+00 | −1.627220E+00 | 1.042522E−01 | 1.090486E+00 | −1.300518E−02 |
| A8 | 5.005995E−02 | −6.680129E+00 | 5.070337E+00 | −3.659246E−01 | −6.343059E−01 | 2.915734E+00 |
| A10 | −1.299570E−02 | 1.155166E+01 | −1.358769E+01 | 8.197840E+00 | −2.595325E+00 | −2.299288E+00 |
| A12 | −5.339317E−03 | 1.923040E+01 | −1.169272E+01 | −5.305959E+01 | 8.389142E+00 | 8.146113E−01 |
| A14 | 3.718185E−03 | −5.888235E+01 | 9.236754E+01 | 1.262471E+02 | −2.874510E+00 | −5.492294E−01 |
| A16 | −4.647935E−04 | −6.434718E+00 | −4.671374E+01 | −7.856955E+01 | −1.467555E+01 | 1.060435E+01 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −3.580386E−02 | −3.435990E−03 | 2.726412E−01 | 3.206008E−01 | −4.907161E−01 | −3.546533E−01 |
| A6 | 7.586707E−01 | −4.293507E−01 | 4.105693E−01 | 3.953662E−01 | 9.052728E−01 | 3.220927E−01 |
| A8 | −7.995917E+00 | 2.468508E+00 | −8.167526E+00 | −2.026529E+00 | −1.804219E+00 | −3.191399E−01 |
| A10 | 4.647463E+01 | −9.187700E−01 | 4.117646E+01 | 5.108369E+00 | 2.562662E+00 | 1.924989E−01 |
| A12 | −1.384336E+02 | −9.827602E+00 | −1.041626E+02 | −9.065113E+00 | −2.190852E+00 | −5.735314E−02 |
| A14 | 2.064766E+02 | 2.164491E+01 | 1.267483E+02 | 8.939331E+00 | 9.862871E−01 | 2.857176E−03 |
| A16 | −1.260000E+02 | −1.518947E+01 | −5.759182E+01 | −3.511051E+00 | −1.807467E−01 | 1.273460E−03 |

The imaging lens in Example 5 satisfies conditional expressions (1) to (18) as shown in Table 8.

Figure 10:
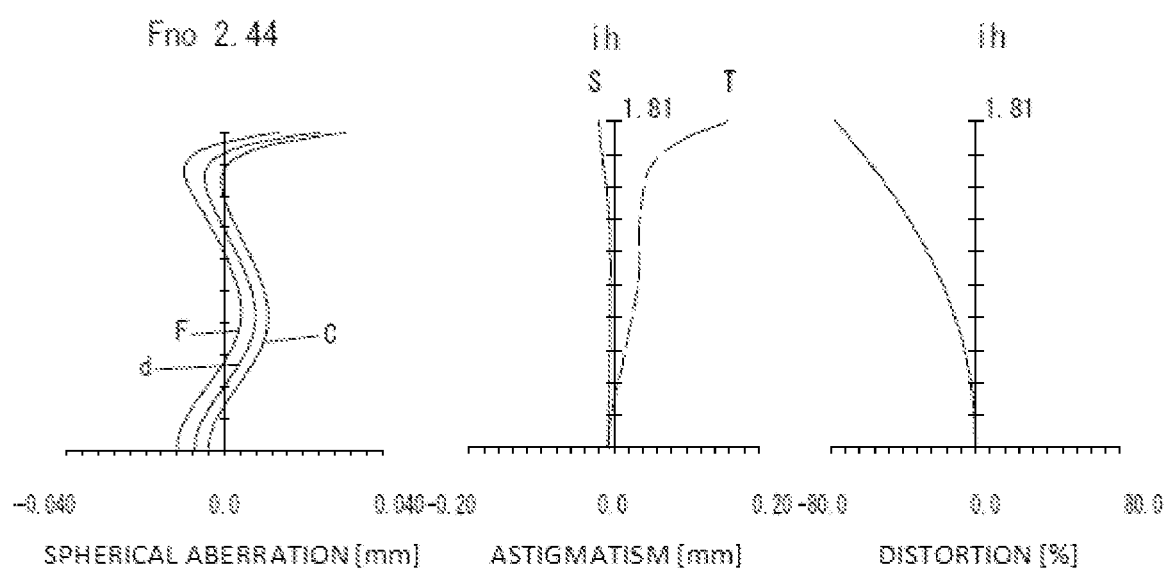
FIG. 10 shows spherical aberration, astigmatism, and distortion of the imaging lens in Example 5 according to the present invention.

FIG. 10 shows spherical aberration (mm), astigmatism (mm), and distortion (%) of the imaging lens in Example 5. As shown in FIG. 10, each aberration is corrected excellently.

Example 6

The basic lens data is shown below in Table 6.

TABLE 6

Example 6
Unit mm
f = 1.29
Fno = 2.44
ω(°) = 80.0
ih = 1.81
TTL = 4.19

| Surface Data | | | | |
|---|---|---|---|---|
| i | r | d | Nd | vd |
| (Object) | Infinity | Infinity | | |
| 1* | Infinity | 0.3506 | 1.544 | 55.93 (vd1) |
| 2* | 0.6955 | 0.3249 | | |
| 3* | 0.7842 | 0.2473 | 1.639 | 23.52 (vd2) |
| 4* | 0.9233 | 0.3613 | | |
| 5 (Stop) | Infinity | −0.0096 | | |
| 6* | 3.1524 | 0.4499 | 1.544 | 55.93 (vd3) |
| 7* | −0.9716 | 0.0200 | | |
| 8* | −647.0146 | 0.5273 | 1.535 | 55.69 (vd4) |
| 9* | −0.9393 | 0.1048 | | |
| 10* | −1.6181 | 0.2676 | 1.661 | 20.37 (vd5) |
| 11* | 4.3741 | 0.1921 | | |
| 12* | 1.4455 | 0.5043 | 1.535 | 55.69 (vd6) |
| 13* | 1.8105 | 0.7000 | | |
| 14 | Infinity | 0.1100 | 1.517 | 64.20 |
| 15 | Infinity | 0.0794 | | |
| Image Plane | Infinity | | | |

| Constituent Lens Data | | |
|---|---|---|
| Lens | Start Surface | Focal Length |
| 1 | 1 | −1.278 |
| 2 | 3 | 4.810 |
| 3 | 6 | 1.419 |
| 4 | 8 | 1.758 |
| 5 | 10 | −1.756 |
| 6 | 12 | 9.049 |

| Aspheric Surface Data | | | | | |
|---|---|---|---|---|---|
| | First Surface | Second Surface | Third Surface | Fourth Surface | Sixth Surface | Seventh Surface |
| k | 0.000000E+00 | −1.124941E+00 | 0.000000E+00 | 0.000000E+00 | 0.000000E+00 | 0.000000E+00 |
| A4 | 4.177001E−02 | −1.061067E−01 | −2.809340E−01 | 7.907837E−01 | 8.628675E−02 | 3.617064E−01 |
| A6 | −1.377109E−02 | −7.112523E−01 | −1.138262E+00 | −2.930808E+00 | 4.531063E−01 | −7.426238E−01 |
| A8 | 2.463353E−03 | 2.340589E+00 | 2.471141E+00 | 3.371021E+01 | −1.549624E+00 | 1.197321E+00 |
| A10 | 1.755343E−05 | −3.240243E+00 | −3.312065E+00 | −7.529146E+00 | 1.318071E+00 | −1.859018E+01 |
| A12 | −2.926619E−05 | 9.915731E−01 | −6.769967E+00 | −1.016201E+03 | 3.259185E+01 | 3.064104E+01 |
| A14 | 1.199741E−06 | 2.331107E+00 | 1.347531E+01 | 5.844856E+03 | −1.281205E+02 | 1.000284E+02 |
| A16 | −4.016891E−07 | −1.643059E+00 | −1.462871E+01 | −1.090793E+04 | 1.293895E+02 | −1.772001E+02 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | 2.240324E+00 | 0.000000E+00 | 0.000000E+00 | 7.177213E−01 |
| A4 | 3.445906E−01 | 4.939367E−02 | 1.243502E−01 | 5.113671E−02 | −5.505541E−01 | −2.869099E−01 |
| A6 | −2.568728E−01 | 9.120140E−01 | 1.018130E−02 | −1.565775E−01 | 3.899083E−01 | 2.805043E−02 |
| A8 | −1.607711E+00 | −1.414432E−03 | −1.252780E+00 | 1.892678E−02 | −1.994064E−01 | 3.603741E−02 |
| A10 | 2.208234E+00 | 1.070071E−01 | 2.646281E+00 | 9.150100E−02 | 4.606470E−02 | −3.496607E−02 |
| A12 | −1.400261E+00 | −2.075639E+00 | −7.344162E−01 | 7.749821E−02 | −2.518405E−02 | −1.050660E−03 |
| A14 | −5.503477E+00 | −5.730341E+00 | −2.116262E+00 | −1.995168E−01 | 2.307903E−02 | 6.838769E−03 |
| A16 | 1.101734E+01 | 1.213549E+01 | 1.564196E+00 | 7.648004E−02 | −5.623237E−03 | −1.970665E−03 |

The imaging lens in Example 6 satisfies conditional expressions (1) to (18) as shown in Table 8.

Figure 12:
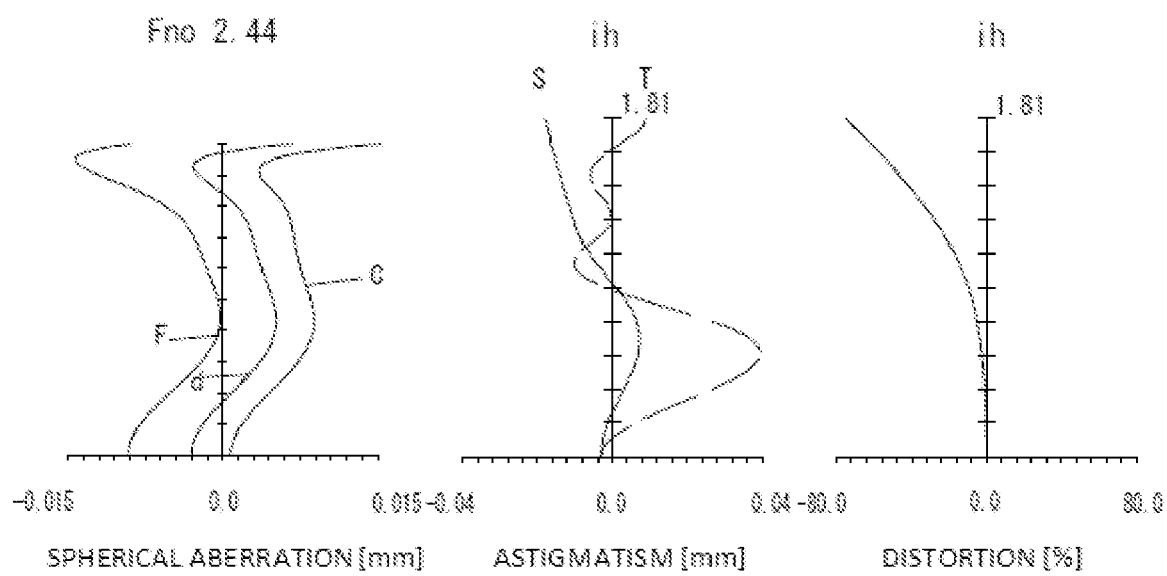
FIG. 12 shows spherical aberration, astigmatism, and distortion of the imaging lens in Example 6 according to the present invention.

FIG. 12 shows spherical aberration (mm), astigmatism (mm), and distortion (%) of the imaging lens in Example 6. As shown in FIG. 12, each aberration is corrected excellently.

Example 7

The basic lens data is shown below in Table 7.

TABLE 7

Example 7
Unit mm
f = 1.04
Fno = 2.44
ω(°) = 79.9
ih = 1.81
TTL = 4.21

Surface Data

| i | r | d | Nd | vd |
|---|---|---|---|---|
| (Object) | Infinity | Infinity | | |
| 1* | Infinity | 0.4805 | 1.544 | 55.93 (vd1) |
| 2* | 0.6024 | 0.4761 | | |
| 3* | 0.8519 | 0.5080 | 1.639 | 23.52 (vd2) |
| 4* | 1.3654 | 0.1932 | | |
| 5 (Stop) | Infinity | −0.0272 | | |
| 6* | 1.6268 | 0.4030 | 1.544 | 55.93 (vd3) |
| 7* | −1.0949 | 0.0798 | | |
| 8* | −1.8865 | 0.2300 | 1.671 | 19.24 (vd4) |
| 9* | 9.2805 | 0.0333 | | |
| 10* | −22.5660 | 0.4000 | 1.535 | 55.69 (vd5) |
| 11* | −0.9143 | 0.0300 | | |
| 12* | 1.6666 | 0.5087 | 1.535 | 55.69 (vd6) |
| 13* | 1.3797 | 0.3000 | | |
| 14 | Infinity | 0.1100 | 1.517 | 64.20 |
| 15 | Infinity | 0.5251 | | |
| Image Plane | Infinity | | | |

Constituent Lens Data

| Lens | Start Surface | Focal Length |
|---|---|---|
| 1 | 1 | −1.107 |
| 2 | 3 | 2.557 |
| 3 | 6 | 1.269 |
| 4 | 8 | −2.318 |
| 5 | 10 | 1.770 |
| 6 | 12 | −39.209 |

Aspheric Surface Data

| | First Surface | Second Surface | Third Surface | Fourth Surface | Sixth Surface | Seventh Surface |
|---|---|---|---|---|---|---|
| k | 0.000000E+00 | −1.016862E+00 | 0.000000E+00 | 0.000000E+00 | 0.000000E+00 | 0.000000E+00 |
| A4 | 3.925564E−02 | 1.850613E−02 | −2.438335E−01 | 2.793163E−01 | 3.498566E−01 | −6.390218E−01 |
| A6 | −1.489892E−02 | −3.152474E−01 | −1.367566E−01 | 1.801369E+00 | −2.722103E+01 | −4.915093E+00 |
| A8 | 2.080266E−03 | 2.108819E+00 | 1.979000E+00 | 6.106182E+00 | 7.750844E+02 | 6.364942E+01 |
| A10 | −3.266468E−05 | −3.530468E+00 | −4.392687E+00 | 2.617795E+01 | −1.083796E+04 | −6.802052E+02 |
| A12 | −2.554786E−05 | 6.804484E−01 | −3.290100E+00 | −4.365542E+02 | 7.200428E+04 | 3.064650E+03 |
| A14 | 6.139750E−06 | 1.968440E+00 | 2.381291E+01 | 1.629976E+03 | −1.856668E+05 | −5.256832E+03 |
| A16 | −6.750909E−07 | −1.008678E+00 | −2.565881E+01 | 0.000000E+00 | 0.000000E+00 | 0.000000E+00 |

| | Eighth Surface | Ninth Surface | Tenth Surface | Eleventh Surface | Twelfth Surface | Thirteenth Surface |
|---|---|---|---|---|---|---|
| k | 1.081619E+01 | 0.000000E+00 | 0.000000E+00 | 0.000000E+00 | 0.000000E+00 | −4.784601E−02 |
| A4 | −9.885094E−01 | −5.958257E−01 | 3.435204E−01 | 4.037060E−01 | −4.524146E−01 | −3.930506E−01 |
| A6 | 1.690486E+00 | 8.677768E−01 | −2.134236E−01 | 8.523969E−01 | 2.734536E−01 | 1.381048E−01 |
| A8 | −3.524127E+00 | −6.339680E−01 | −6.415994E−01 | 1.370713E−01 | −1.661713E−01 | −1.043767E−02 |
| A10 | −2.547145E+01 | −1.278834E+00 | 2.729038E+00 | 3.326611E−01 | 1.305815E−01 | −4.078286E−02 |
| A12 | −1.102253E+02 | 3.304414E−01 | −1.896232E+00 | −1.375531E+00 | −3.134793E−02 | 6.705193E−03 |
| A14 | 8.692800E+02 | −9.808301E+00 | −7.310277E+00 | −3.304820E+00 | −4.201607E−02 | 9.892140E−03 |
| A16 | 8.360693E+01 | 2.699770E+01 | 5.078755E+00 | 4.523212E+00 | 6.853848E−03 | −4.330080E−03 |

The imaging lens in Example 7 satisfies conditional expressions (1) to (18) as shown in Table 8.

Figure 14:
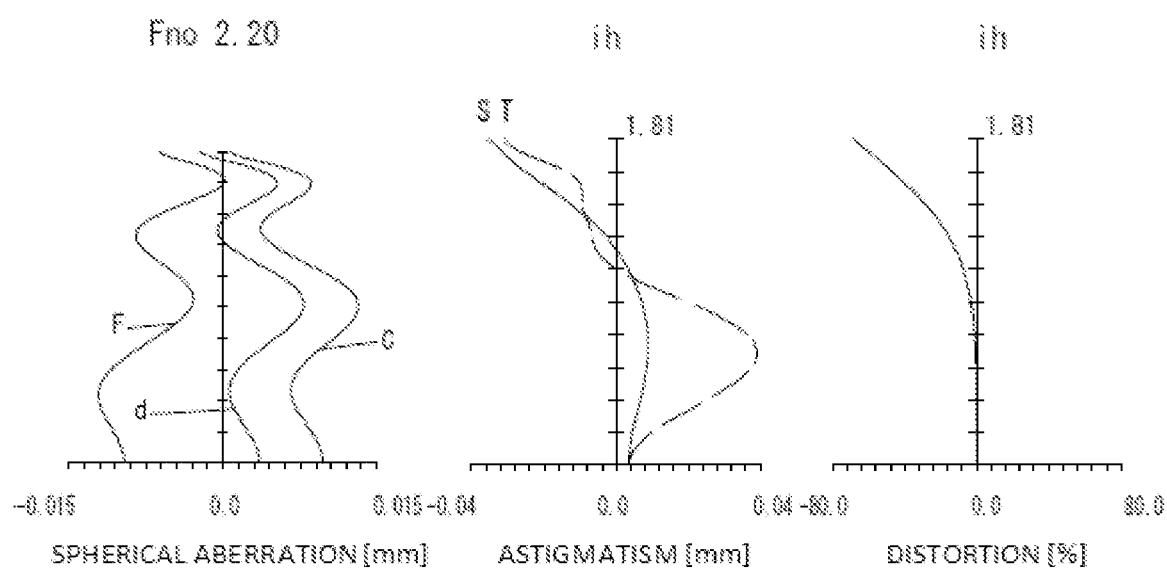
FIG. 14 shows spherical aberration, astigmatism, and distortion of the imaging lens in Example 7 according to the present invention.

FIG. 14 shows spherical aberration (mm), astigmatism (mm), and distortion (%) of the imaging lens in Example 7. As shown in FIG. 14, each aberration is corrected excellently.

In table 8, values of conditional expressions (1) to (18) related to the Examples 1 to 7 are shown.

TABLE 8

| | Conditional Expressions | Example 1 | Example 2 | Example 3 | Example 4 | Example 5 | Example 6 | Example 7 |
|---|---|---|---|---|---|---|---|---|
| (1) | vd2/vd6 | 0.35 | 0.35 | 0.35 | 0.35 | 0.35 | 0.42 | 0.42 |
| (2) | \|f6\|/D6 | 79.78 | 39.90 | 57.46 | 81.20 | 38.11 | 17.94 | 77.08 |
| (3) | r12/r2/D6 | 3.96 | 3.65 | 3.59 | 3.38 | 3.53 | 5.16 | 4.50 |
| (4) | \|f6\|/f | 28.46 | 15.32 | 22.68 | 29.33 | 16.24 | 7.02 | 37.88 |
| (5) | \|f6\|/f1 | −27.78 | −15.19 | −22.86 | −30.00 | −16.09 | −7.08 | −35.43 |
| (6) | r2/r6 | −0.72 | −0.72 | −0.67 | −0.72 | −0.66 | −0.72 | −0.55 |
| (7) | r6/r12 | −0.65 | −0.63 | −0.71 | −0.69 | −0.69 | −0.54 | −0.79 |
| (8) | r12/f | 1.19 | 1.20 | 1.21 | 1.17 | 1.28 | 1.40 | 1.33 |
| (9) | T4/T5 | 0.54 | 0.37 | 0.57 | 0.63 | 0.65 | 0.55 | 1.11 |
| (10) | f3/D3 | 5.36 | 6.26 | 5.54 | 5.22 | 5.69 | 3.15 | 3.15 |
| (11) | \|f5\|/f | 1.35 | 1.36 | 1.35 | 1.33 | 1.38 | 1.36 | 1.71 |
| (12) | f1/\|f5\| | −0.76 | −0.74 | −0.73 | −0.73 | −0.73 | −0.73 | −0.63 |
| (13) | f3/\|f4\| | 1.38 | 1.39 | 1.33 | 1.31 | 1.33 | 0.81 | 0.55 |
| (14) | r6/D3 | −2.86 | −3.25 | −3.51 | −3.32 | −3.59 | −2.16 | −2.72 |
| (15) | \|r8\|/r11 | 0.87 | 0.95 | 0.82 | 0.75 | 0.84 | 0.65 | 5.57 |
| (16) | r9/f | −1.00 | −1.07 | −0.87 | −0.92 | −0.90 | −1.25 | −21.80 |
| (17) | r11/f | 1.22 | 1.16 | 1.23 | 1.40 | 1.24 | 1.12 | 1.61 |
| (18) | r12/r2 | 2.14 | 2.19 | 2.12 | 2.02 | 2.20 | 2.60 | 2.29 |

When the imaging lens according to the present invention is adopted to a product with the camera function, there is realized contribution to a wide field of view and low F-number of the camera and also high performance thereof.

DESCRIPTION OF REFERENCE NUMERALS

ST: aperture stop
L1: first lens
L2: second lens
L3: third lens
L4: fourth lens
L5: fifth lens
L6: sixth lens
ih: maximum image height
IR: filter
IMG: imaging plane

What is claimed is:

1. An imaging lens comprising in order from an object side to an image side, a first lens with negative refractive power in a paraxial region,
   a second lens with positive refractive power having a convex object-side surface in a paraxial region,
   a third lens with positive refractive power in a paraxial region, a fourth lens,
   a fifth lens having a concave object-side surface in a paraxial region, and
   a sixth lens having a concave image-side surface in a paraxial region, wherein the following conditional expressions (1), (2) and (3) are satisfied:

$$0.20 < vd2/vd6 < 0.60 \quad (1)$$

$$12.50 < |f6|/D6 < 90.00 \quad (2)$$

$$2.50 < (r12/r2)/D6 < 7.00 \quad (3)$$

where
vd2: an abbe number at d-ray of the second lens,
vd6: an abbe number at d-ray of the sixth lens,
f6: a focal length of the sixth lens,
D6: a thickness along the optical axis of the sixth lens,
r12: a paraxial curvature radius of an image-side surface of the sixth lens,
r2: a paraxial curvature radius of an image-side surface of the first lens, and
D6: a thickness along the optical axis of the sixth lens.

2. The imaging lens according to claim 1, wherein an image-side surface of said third lens is convex in the paraxial region.

3. The imaging lens according to claim 1, wherein the following conditional expression (4) is satisfied:

$$5.25 < |f6|/f < 50.00 \quad (4)$$

where
f6: a focal length of the sixth lens, and
f: a focal length of the overall optical system of the imaging lens.

4. The imaging lens according to claim 1, wherein the following conditional expression (5) is satisfied:

$$-45.00 < |f6|/f1 < -5.00 \quad (5)$$

where
f6: a focal length of the sixth lens, and
f1: a focal length of the first lens.

5. The imaging lens according to claim 1, wherein the following conditional expression (6) is satisfied:

$$-0.95 < r2/r6 < -0.40 \quad (6)$$

where
r2: a paraxial curvature radius of an image-side surface of the first lens, and
r6: a paraxial curvature radius of an image-side surface of the third lens.

6. The imaging lens according to claim 1, wherein the following conditional expression (7) is satisfied:

$$-1.00 < r6/r12 < -0.25 \quad (7)$$

where
r6: a paraxial curvature radius of an image-side surface of the third lens, and
r12: a paraxial curvature radius of an image-side surface of the sixth lens.

7. The imaging lens according to claim 1, wherein the following conditional expression (8) is satisfied:

$$0.75 < r12/f < 2.00 \tag{8}$$

where
- r12: a paraxial curvature radius of an image-side surface of the sixth lens, and
- f: a focal length of the overall optical system of the imaging lens.

\* \* \* \* \*